(12) United States Patent
Gotanda et al.

(10) Patent No.: US 10,671,990 B2
(45) Date of Patent: Jun. 2, 2020

(54) REGISTER APPARATUS HAVING A STATUS INDICATOR ASSOCIATED WITH A PREDETERMINED SALES RESTRICTION

(71) Applicant: TOSHIBA TEC KABUSHIKI KAISHA, Tokyo (JP)

(72) Inventors: Tsuyoshi Gotanda, Ota Tokyo (JP); Jun Kikuchi, Tagata Shizuoka (JP); Akiko Susaki, Yokohama Kanagawa (JP); Jun Miyazaki, Ota Tokyo (JP); Jun Yoshitomi, Koganei Tokyo (JP); Shun Hashimoto, Fukuoka Fukuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/273,745

(22) Filed: Feb. 12, 2019

(65) Prior Publication Data
US 2019/0259017 A1  Aug. 22, 2019

(30) Foreign Application Priority Data
Feb. 16, 2018  (JP) .................................. 2018-025964

(51) Int. Cl.
*G06Q 20/20* (2012.01)
*G07G 1/00* (2006.01)
(Continued)

(52) U.S. Cl.
CPC ......... *G06Q 20/209* (2013.01); *G06K 7/1404* (2013.01); *G06Q 20/20* (2013.01);
(Continued)

(58) Field of Classification Search
CPC .... G06Q 20/20; G06Q 20/202; G06Q 20/208; G07G 1/0036; G07G 1/0045; G07G 1/0054; G07G 1/01
See application file for complete search history.

(56) References Cited

U.S. PATENT DOCUMENTS

| | | | |
|---|---|---|---|
| 2009/0125405 A1* | 5/2009 | Shin ........................ | G06Q 20/20 705/22 |
| 2011/0010259 A1* | 1/2011 | Yoshimoto ............. | G06Q 30/06 705/26.1 |

(Continued)

FOREIGN PATENT DOCUMENTS

| | | |
|---|---|---|
| JP | 2001-266253 A | 9/2001 |
| JP | 2009020667 A * | 1/2009 |

OTHER PUBLICATIONS

English equivalent machine translation of JP 2009020667, Japanese Patent Office (Year: 2019).*

*Primary Examiner* — Suezu Ellis
(74) *Attorney, Agent, or Firm* — Kim & Stewart LLP

(57) ABSTRACT

A register apparatus includes a scanner, an operation panel, a status indicator, and a processor. The processor is configured to process a product code of a product for a transaction obtained through the scanner or the operation panel, to determine whether or not the product code is associated with a predetermined sales restriction and whether or not sale is allowed for the product. The processor is also configured to control the status indicator to perform a first indication when the product code is determined to be not associated with the predetermined sales restriction, a second indication when the product code is determined to be associated with the predetermined sales restriction and sales is determined to be allowed for the transaction, and a third indication when the (Continued)

product code is determined to be associated with the predetermined sales restriction and sales is determined to be not allowed for the transaction.

19 Claims, 9 Drawing Sheets

(51) Int. Cl.
*G07G 3/00* (2006.01)
*G07G 1/01* (2006.01)
*G06K 7/14* (2006.01)
*G07F 9/02* (2006.01)
*G06Q 20/40* (2012.01)

(52) U.S. Cl.
CPC ......... *G06Q 20/202* (2013.01); *G06Q 20/206* (2013.01); *G06Q 20/208* (2013.01); *G06Q 20/405* (2013.01); *G07F 9/026* (2013.01); *G07G 1/0054* (2013.01); *G07G 1/01* (2013.01); *G07G 3/00* (2013.01)

(56) References Cited

U.S. PATENT DOCUMENTS

| | | | | |
|---|---|---|---|---|
| 2011/0210168 A1* | 9/2011 | Haibara | ................. | G06Q 30/06 235/375 |
| 2015/0213425 A1* | 7/2015 | Namura | ............... | G06Q 20/202 705/21 |
| 2017/0178132 A1* | 6/2017 | Sugita | .................... | G06Q 20/10 |
| 2017/0186059 A1* | 6/2017 | Ogawa | ................ | G06Q 20/208 |
| 2019/0005477 A1* | 1/2019 | Sanders | ............. | G06Q 30/0601 |

* cited by examiner

| COMMODITY CODE |
| --- |
| COMMODITY NAME |
| PRICE |
| BARCODE PRESENCE OR ABSENCE FLAG F1 |
| SALE RESTRICTION FLAG F2 |
| ⋮ |

| EVENT | COLOR |
| --- | --- |
| SCAN REGISTRATION | C1 |
| TOUCH REGISTRATION | C2 |
| SALES RESTRICTION CLEARED | C3 |
| SALES RESTRICTION NOT CLEARED | C4 |

| EVENT | COLOR | PRIORITY | STATE |
| --- | --- | --- | --- |
| CHANGE MACHINE ERROR | C5 | 1 | 1or0 |
| RESIDUAL DETECTION | C6 | 2 | 1or0 |
| NEAR WARNING | C7 | 3 | 1or0 |

REGISTER APPARATUS HAVING A STATUS INDICATOR ASSOCIATED WITH A PREDETERMINED SALES RESTRICTION

CROSS-REFERENCE TO RELATED APPLICATION

This application is based upon and claims the benefit of priority from Japanese Patent Application No. 2018-025964, filed on Feb. 16, 2018, the entire contents of which are incorporated herein by reference.

FIELD

Embodiments described herein relate generally to a register apparatus.

BACKGROUND

A commodity sales data processing apparatus is an electronic apparatus, e.g., a so-called POS (Point of Sales) terminal or ECR (Electronic Cash Register), that performs a processing of sales data of a commodity purchased by a customer. In this type of commodity sales data processing apparatus, a scanner and a touch panel may be utilized as an input device for inputting a commodity code for identifying the commodity.

The scanner scans a code symbol such as a barcode. A controller that controls the scanner analyzes the scanned code symbol to acquire a commodity code. In this way, the scanner is employed for input of a commodity to which the code symbol representing the commodity code is attached.

The touch panel displays a plurality of button images to which commodity codes are respectively assigned on a panel surface thereof. When detecting that one of the button images is touch-input, the controller that controls the touch panel acquires the commodity code assigned to the button image touched. As described above, the touch panel is mainly utilized for input of a commodity to which no code symbol is attached, for example, fresh food and the like.

The scanner issues a notification sound every time a code symbol is scanned. The operator which uses the scanner can notice or recognize with the notification sound that the code symbol is certainly and correctly scanned and the commodity code is acquired. However, the sales data of the commodity identified by the acquired commodity code may not be necessarily processed by the commodity sales data processing apparatus even if the code symbol is certainly scanned. For example, in the case of a commodity with a minimum age requirement such as alcoholic beverages and cigarettes, an operation of age verification may be required. If the operation of age verification is not performed, the commodity sales data processing apparatus may not start a processing, i.e., registration, for the sales data of the commodity.

In the commodity sales data processing apparatus described above, upon processing the sales data of the commodity, the name, unit price, and the like of the commodity are displayed on a display device. Therefore, the operator can recognize from the information displayed on the display device that the sales data has been correctly processed. However, if the operator needs to confirm the contents of the display each time a commodity code is input, the work efficiency of the operator may be significantly affected. For this reason, it is desirable that the operator can more easily recognize that the sales data has been correctly processed.

DESCRIPTION OF THE DRAWINGS

FIG. 5 is a schematic diagram illustrating a structure of a data record for a commodity stored in a commodity data file.

FIG. 6 is a schematic diagram illustrating a data structure of a first table.

FIG. 7 is a schematic diagram illustrating a data structure of a second table.

DETAILED DESCRIPTION

According to an embodiment, a register apparatus includes a scanner, an operation panel, a status indicator, and a processor. The processor is configured to process a product code of a product for a transaction obtained through the scanner or the operation panel, to determine whether or not the product code is associated with a predetermined sales restriction and whether or not sale is allowed for the product. The processor is also configured to control the status indicator to perform a first indication when the product code is determined to be not associated with the predetermined sales restriction, a second indication when the product code is determined to be associated with the predetermined sales restriction and sales is determined to be allowed for the transaction, and a third indication when the product code is determined to be associated with the predetermined sales restriction and sales is determined to be not allowed for the transaction.

Hereinafter, an embodiment of a commodity sales data processing apparatus that enables an operator to intuitively confirm that sales data is correctly processed is described with reference to the drawings. In the embodiment, a function as the commodity sales data processing apparatus is applied to a register of a checkout system of a semi-self-service type. First, a checkout system of a semi-self-service type is described.

Figure 1:
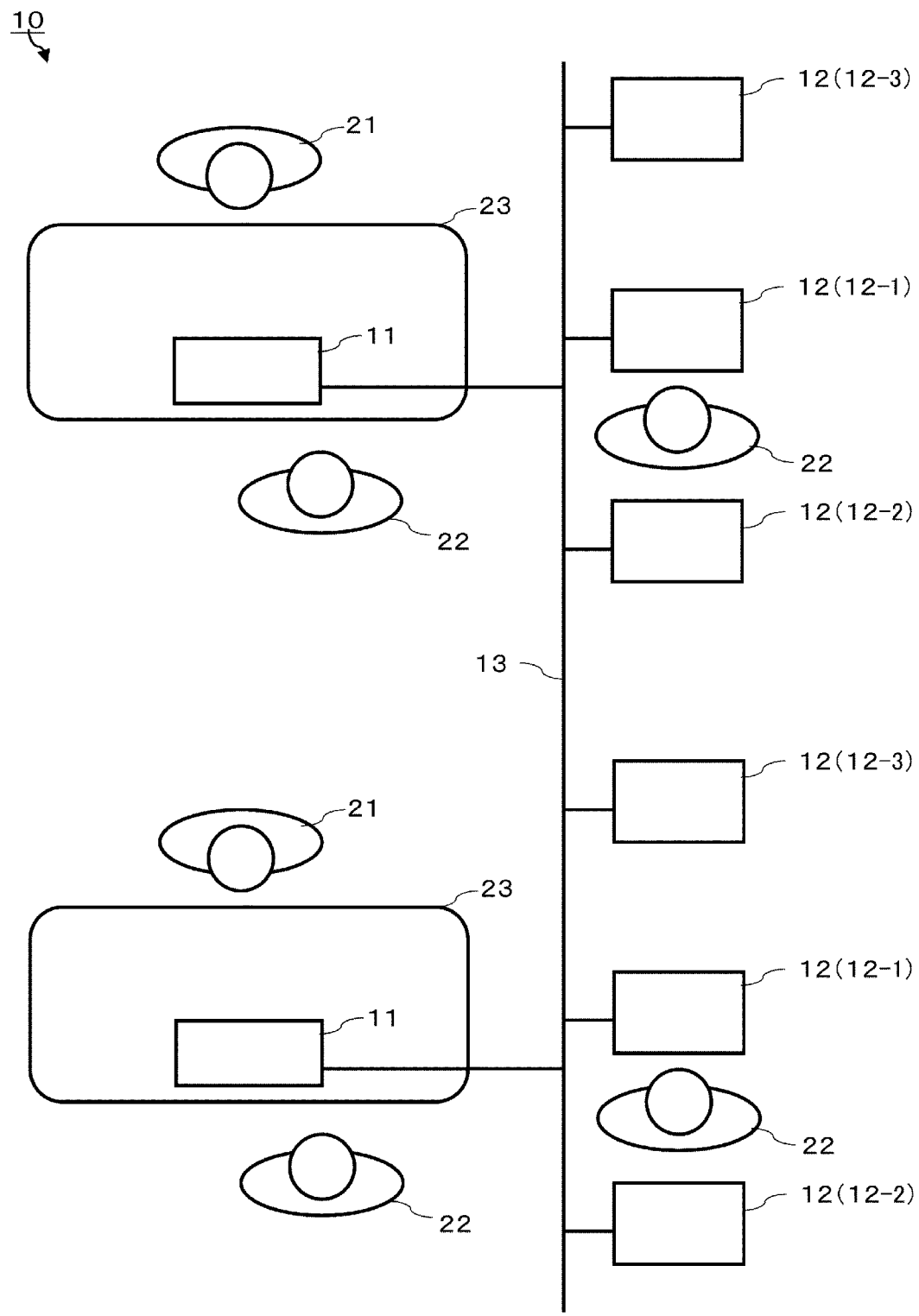
FIG. 1 is a schematic diagram illustrating a checkout system of a semi-self-service type.

FIG. 1 is a schematic diagram illustrating a checkout system 10 of a semi-self-service type. The checkout system 10 includes a plurality of registers 11, a settlement machine 12 having number of units more than that of the registers 11, and a network 13. The settlement machine 12 may be referred to as a casher apparatus. Both the registers 11 and the settlement machines 12 are connected to the network 13. The network 13 is, for example, a local area network (LAN).

The register 11 and the settlement machine 12 are arranged for each checkout lane in a store. In FIG. 1, two registers 11 and six settlement machines 12 are arranged in two checkout lanes. In more detail, one register 11 and three settlement machines 12 are arranged for one checkout lane. In the store, the number of registers 11 and settlement machines 12 included in the checkout system 10 may be arbitrarily determined. In addition, the ratio of the number of registers 11 and settlement machines 12 arranged in one checkout lane may also be arbitrarily determined.

In the store, a store clerk 21 called as a checker is an operator of the register 11, and a shopper 22 who purchases commodities is an operator of the settlement machine 2. However, the settlement machine 12 may be operated by the store clerk 21.

In FIG. 1, the register 11 is disposed on a work table 23. The work table 23 has a rectangular top board. A plurality of the work tables 23 is arranged such that the top boards in a longitudinal shape are substantially in parallel with one another, and thus, a passage (checkout lane) for the shopper 22 is formed therebetween.

The register 11 has functions of performing registration processing of sales commodities, generation of settlement data, transmission of the settlement data to the settlement machine 12, and settlement processing. The registration processing of sales commodities is to register sales data of commodities purchased by shoppers 22 in the register 11. For example, in the case of a commodity with a barcode, the number of sales commodities and the amount of the commodity are registered in the register 11 by scanning the barcode with a scanner. On the other hand, in the case of a commodity without a barcode, the number of sales commodities and the amount of the commodity are registered in the register 11 by touching the image of a commodity button, representing the commodity, which is displayed on a touch panel. The settlement data includes data relating to the settlement of the sales commodities registered as one transaction. The settlement data also includes a commodity code for identifying a commodity, a commodity name, a unit price, number, amount. The settlement processing performs settlement of a transaction, i.e., an act of commodity trading, based on the settlement data. For settlement of a transaction on the register 11, for example, credit card, gift certificate, and the like are used as a payment media.

If receiving settlement data via the network 13, the settlement machine 12 performs processing of settlement of the transaction with cash, electronic money, or the like as a payment medium based on the settlement data. Therefore, the settlement machine 12 includes an automatic change machine. If the cash exceeding the transaction amount included in the settlement data is input to the automatic change machine, the settlement machine 12 discharges the difference as a change amount to a change tray. Further, the settlement machine 12 includes a reading device for electronic money data. If the settlement machine 12 reads the electronic money data having the balance, i.e., stored electronic money amount, equal to or greater than the transaction amount included in the settlement data, the settlement machine 12 subtracts the transaction amount from the electronic money specified by the data. The settlement machine 12 also has a receipt printer. Upon completion of settlement of the transaction, the settlement machine 12 issues a receipt on which the statement of the transaction is printed.

In the settlement machine 12 having such a configuration, if a machine error such as a coin clogging, a banknote clogging or the like occurs in the automatic change machine, a change machine error signal is generated. Thereafter, if the machine error is resolved, the settlement machine 12 generates a change machine error release signal. If the settlement machine 12 detects that the change discharged to the change tray remains thereon without being collected or removed, the settlement machine 12 generates a residual detection signal. Thereafter, if the change is collected, the settlement machine 12 generates a residual detection release signal. Further, if the settlement machine 12 detects stored change coins or banknotes being a near empty state or a near full state with a sensor, the settlement machine 12 generates a near warning signal. Thereafter, if the near-empty or the near-full state is eliminated, the settlement machine 12 generates a near warning release signal. These warning signals and release signals are output to the network 13 as state signals of the settlement machine 12. Although not shown in FIG. 1, a monitor device for monitoring operations and states of the settlement machine 12 at the back operation office is connected to the network 13, and thus the state of the settlement machine 12 is displayed thereon according to the state signal of the settlement machine 12. The store clerk at the back operation office can notice the state of the settlement machine 12 from the display on the monitor device.

Figure 2:
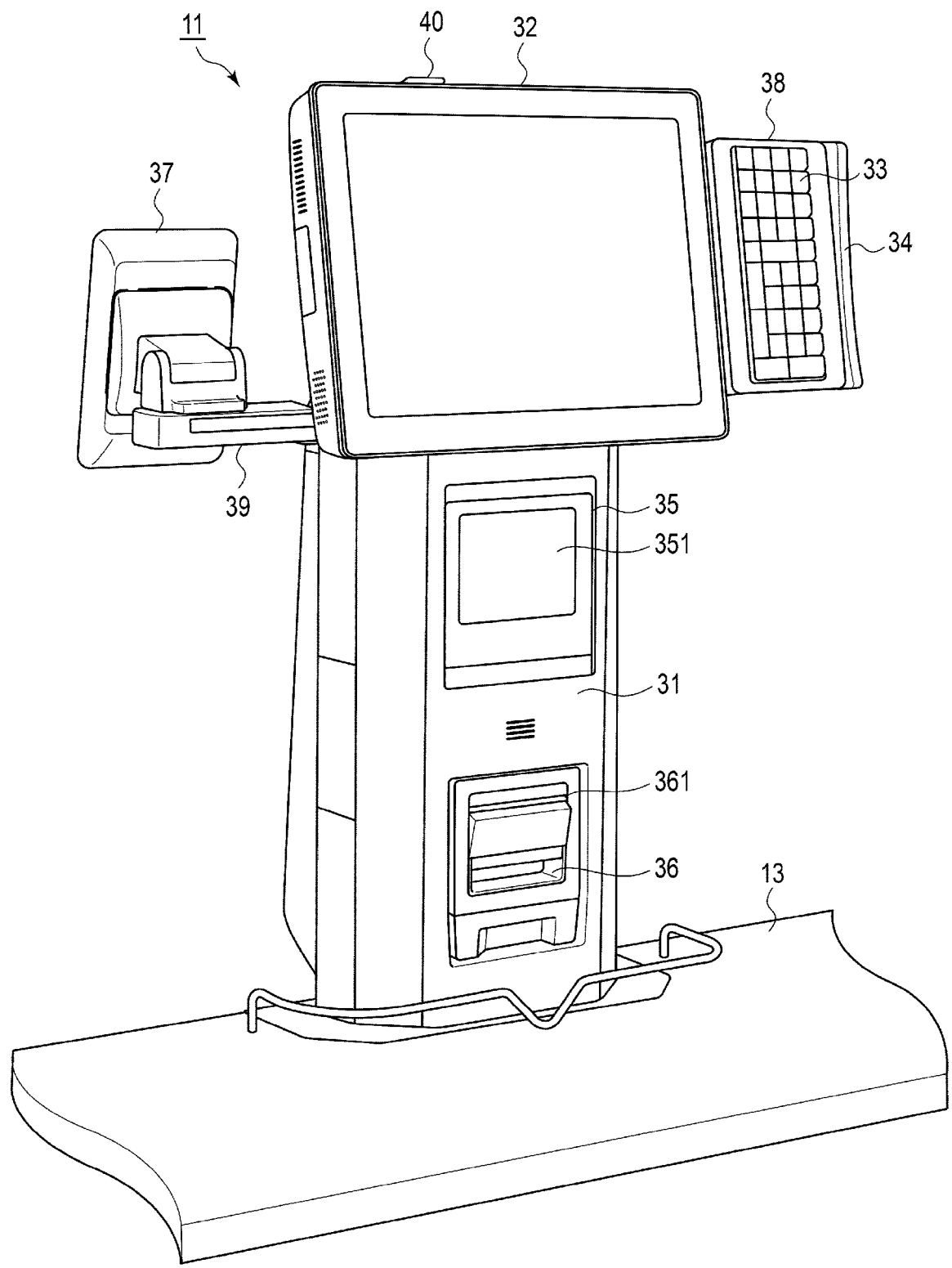
FIG. 2 illustrates a perspective view of a register viewed from a store clerk side.
Figure 3:
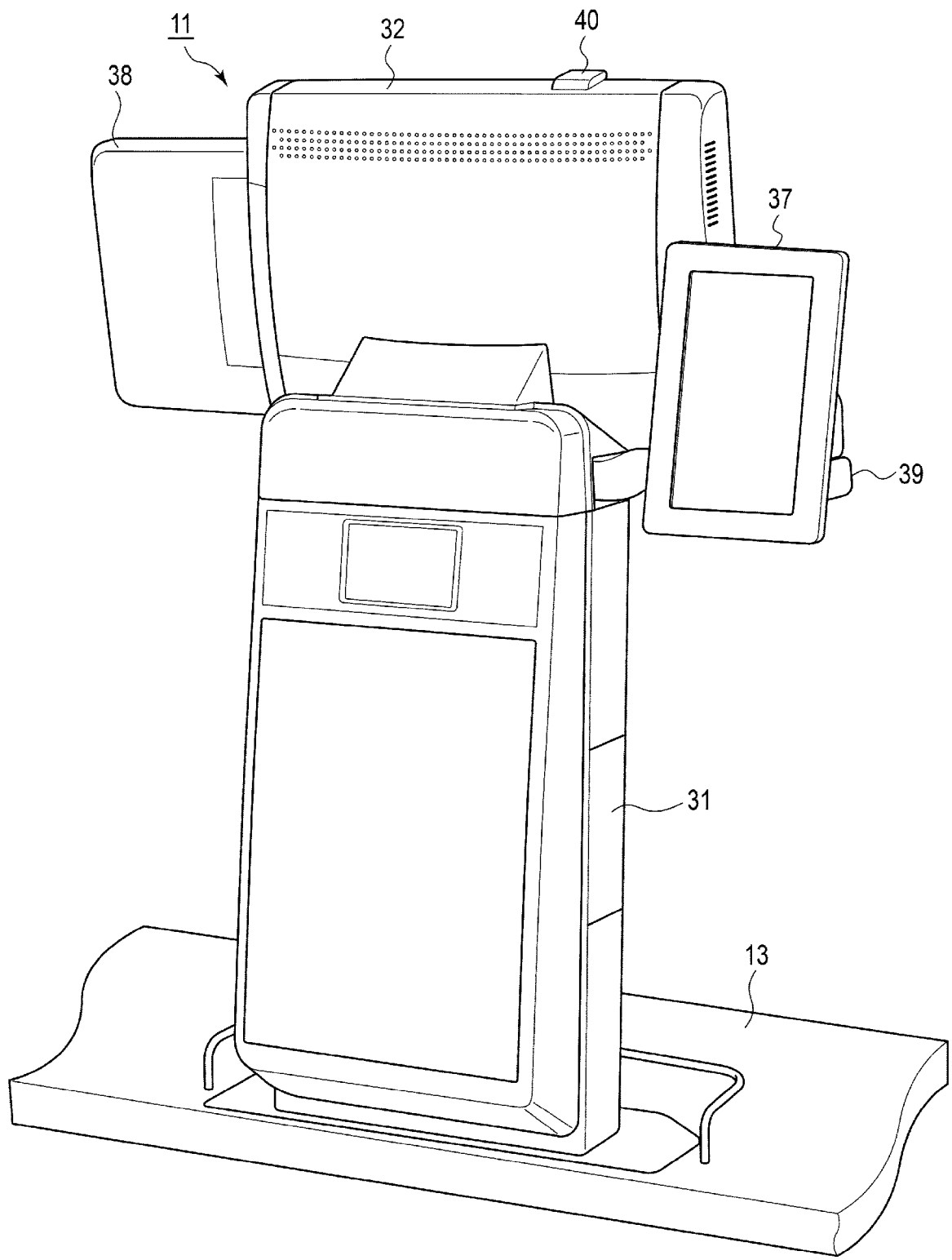
FIG. 3 illustrates a perspective view of the register viewed from a shopper side.

Next, the configuration of the register 11 is described. FIG. 2 illustrates a perspective view of the register 11 viewed from the store clerk 21 side, and FIG. 3 illustrates a perspective view of the register 11 viewed from the shopper 22 side. The register 11 includes a thin rectangular housing 31 having a wide width and a narrow depth. The housing 31 is erected on the top board of the work table 23 with a pair of wide surfaces facing the store clerk 21 side and the shopper 22 side, respectively. Hereinafter, the store clerk 21 side corresponds to the front surface of the register 11 and the shopper 22 side corresponds to the back surface.

The register 11 includes a store clerk touch panel 32, a keyboard 33, a card reader 34, a scanner 35, a printer 36, and a customer touch panel 37. The store clerk touch panel is mounted at the top of the housing 31 with the panel surface facing the front (operator side). The store clerk touch panel 32 functions as a display device for the store clerk 21 and an input device with the store clerk 21 serving as the operator.

The keyboard 33 and the card reader 34 are integrally incorporated in the housing 38 and attached to one of the sides of the store clerk touch panel. The keyboard 33 is a dedicated keyboard on which various keys such as ten keys, a multiplication key, a subtotal key, and the like are arranged. The card reader 34 reads data recorded on a card medium such as a credit card or a point card. In FIGS. 2 and 3, the card reader 34 for reading data on a magnetic card is shown. However, the card reader 34 may be a reader/writer for a contact type IC card or a non-contact type IC card.

The scanner 35 is embedded in the upper part of the housing 31 through a reading window 351 facing the front. The scanner 35 scans a code symbol such as a barcode and a two-dimensional data code held to the reading window 351 to read the code symbol. The scanner 35 is one of the input devices in the register 11.

The printer 36 is embedded in the upper part of the housing 31 with an issuing port 361 facing the front. The printer 36 prints receipt data, credit slip data, and the like on a roll paper to issue the receipt or the credit slip from the issuing port 361.

The customer touch panel 37 is attached to an arm 39 extending horizontally from one of the side-surfaces of the housing 31 with the panel surface facing the back surface (customer side). The customer touch panel 37 functions as a display device for the shopper 22 and an input device with the shopper 22 acting as the operator.

Further, in the register 11, an LED lamp 40 is attached to a part of the upper edge of the frame surrounding the screen of the store clerk touch panel 32. The LED lamp 40 is a light-emitting element that emits lights or blinks in a plurality of colors, for example, red, orange, green, yellow, blue, or the like. The LED lamp 40 performs a notification operation by emitting lights or blinking in different colors. The LED lamp 40 functions as a notification device.

Figure 4:
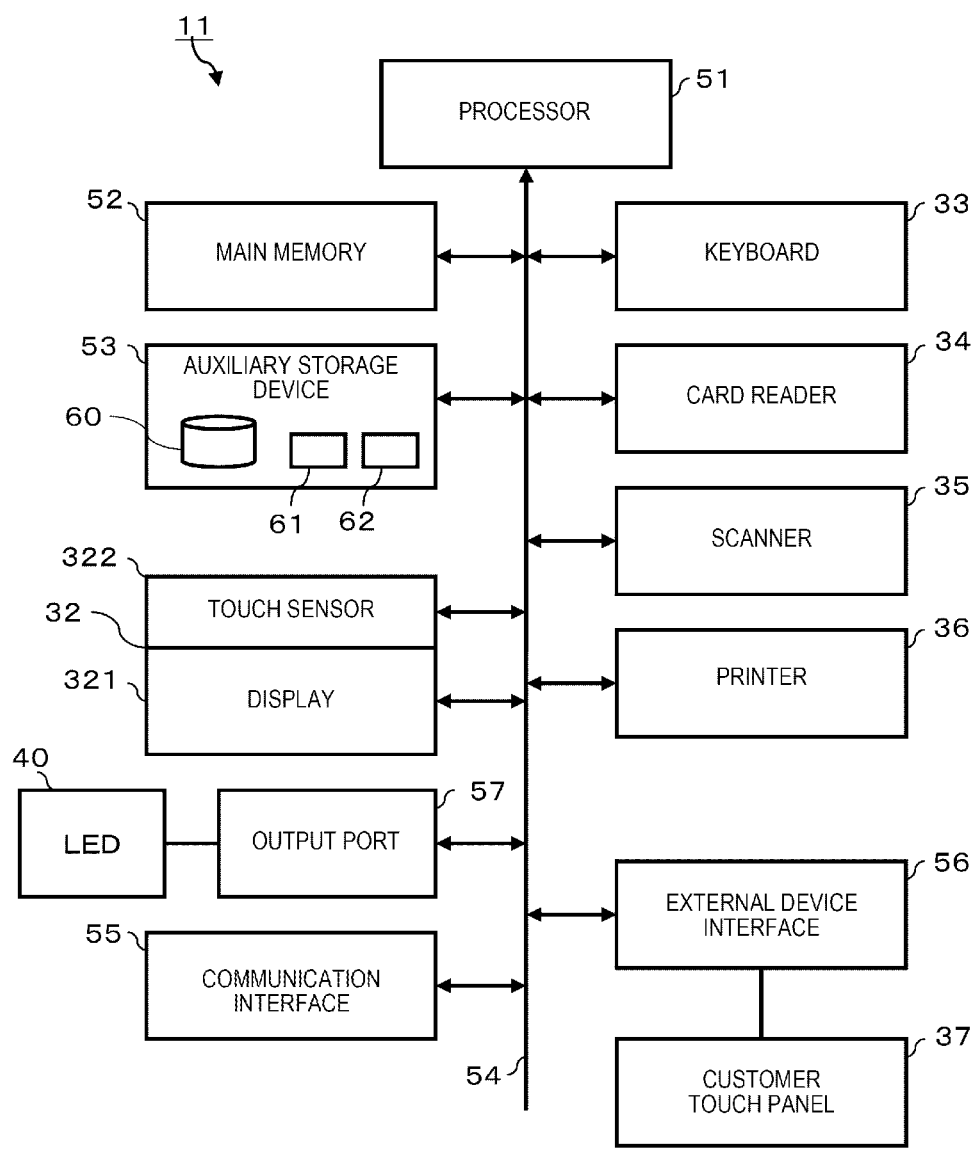
FIG. 4 is a block diagram illustrating a main circuit configuration of the register.

FIG. 4 is a block diagram illustrating the main circuit configuration of the register 11. The same reference numerals are applied to the elements similar to those in FIGS. 2 and 3. The register 11 includes a processor 51, a main memory 52, an auxiliary storage device 53, and a system transmission line 54. The system transmission line 54 includes an address bus, a data bus, a control signal line, and the like. The register 11 is composed of a computer by connecting the processor 51, the main memory 52, and the auxiliary storage device 53 to the system transmission line 54.

The processor 51 acts as a central functional module of the computer. The processor 51 controls each module of the computer to perform various functions as the register 11 according to the operating system and an application program.

The main memory 52 serves as main storage of the computer. The main memory 52 includes a nonvolatile memory area and a volatile memory area. The main memory 52 stores the operating system and the application programs in a nonvolatile memory area. In addition, the main memory 52 stores data necessary for the processor 51 to control each functional module of the computer in a nonvolatile or volatile memory area in some cases. The main memory 52 uses a volatile memory area as a work area in which data is appropriately rewritten by the processor 51.

The auxiliary storage device 53 serves as auxiliary storage of the above computer. For example, an electric erasable programmable read-only memory (EEPROM), a hard disc drive (HDD), a solid state drive (SSD), and the like are utilized as the auxiliary storage device 53. The auxiliary storage device 53 stores data used by the processor 51 in performing various kinds of processing and data generated in a processing by the processor 51. The auxiliary storage device 53 stores the above-described application program in some cases.

The register 11 further includes a communication interface 55, an external device interface 56, and an output port 57, which are connected to the system transmission line 54. The communication interface 55 performs a data communication with other devices connected via a LAN 13 according to a predetermined communication protocol. The other devices include the settlement machine 12, the store server, another register 11, and the like.

The external device interface 56 performs a data communication with an external device connected via a communication cable in accordance with a predetermined communication protocol. The external device is a customer touch panel 37 in the present embodiment. Electronic devices other than the customer touch panel 37, for example, a reader/writer for a non-contact IC card, a keyboard, a printer, and the like may be connected to the external device interface 56.

The output port 57 outputs a drive signal to the LED lamp 40 under the control of the processor 51. The drive signal includes a lighting signal or a blinking signal for each color.

In the register 11, a display 321 and a touch sensor 322 of the store clerk touch panel 32, the keyboard 33, the card reader 34, the scanner 35, and the printer 36 are further connected to the system transmission line 54, respectively via a device controller.

The register 11 having such a configuration stores a commodity data file 60, a first table 61, and a second table 62 in the auxiliary storage device 53. The storage destination of the commodity data file 60, the first table 61, and the second table 62 is not limited to the auxiliary storage device 53. For example, the commodity data file 60, the first table 61, and the second table 62 may be stored in the nonvolatile area of the main memory 52.

The commodity data file 60 stores data for each commodity sold in the store. FIG. 5 is a schematic diagram illustrating the structure of a data record 60R for a commodity recorded in the commodity data file 60. As shown in FIG. 5, the data record 60R includes data items such as a commodity code, a commodity name, a price, a barcode presence/absence flag F1, a sales restriction flag F2, and the like.

The commodity code is a unique code set for each commodity to identify each commodity. The commodity name and the price are the name and the unit price of the commodity identified by the commodity code. The barcode presence/absence flag F1 is a 1-bit data for identifying whether or not the commodity has a barcode thereon. In the present embodiment, in the case of a commodity with a barcode, the barcode presence/absence flag F1 is set to "1", and in the case of a commodity without a barcode, the barcode presence/absence flag F1 is set to "0". The sales restriction flag F2 is a 1-bit data for identifying whether or not the commodity is a sales-restricted commodity. In the present embodiment, the sales restriction flag F2 is set to "1" in the case of a commodity of which sales is restricted depending on a purchaser's age (minimum age requirement), such as alcoholic beverages, cigarettes, and the like, and the sales restriction flag F2 is set to "0" in the case of a commodity of which sales is not restricted. Regarding the sales restriction, items other than age verification may be included.

FIG. 6 is a schematic diagram illustrating the data structure of the first table 61. As shown in the diagram, color data is set for each arbitrary event that may occur in the register 11 in the first table 61. In the present embodiment, color data C1, C2, C3, and C4 are set for the events "scan registration", "touch registration", "sales restriction cleared", and "sales restriction not cleared", respectively. The color data C1, C2, C3, and C4 are data representing luminescent colors of the LED lamp 40. For example, the color data C1 and the color data C2 are different in luminescent colors, respectively.

The event "scan registration" refers to an event in which the sales data of a commodity has been registered by scanning the barcode by the scanner 35. The event "touch registration" refers to an event in which sales data of a commodity has been registered in response to a touch operation on the commodity button displayed on the store clerk touch panel. The event "sales restriction cleared" refers to an event in which sales is permitted for a commodity for which sales is restricted. The event "sale restriction not cleared" refers to an event that sales is not permitted for a commodity for which sales is restricted.

FIG. 7 is a schematic diagram illustrating the data structure of the second table 62. As shown in the diagram, in the second table 62, color data, priority data, and a state flag for each arbitrary event that may occur in the settlement machine 12 are set. In the present embodiment, the color data C5, C6, and C7, the priority data "1", "2", and "3", and state flags "0" or "1" are set for the events "change machine error", "residual detection", and "near warning", respectively. The color data C5, C6, and C7 are data representing the luminescent colors of the LED lamp 40. For example, the color data C5 and the color data C6 are different in luminescent colors. The priority data "1", "2", and "3" refer to ranks of priority if a plurality of events occur simultaneously. In the present embodiment, the smaller the value, the higher the priority is defined. The state flag is a 1-bit data for identifying whether or not a corresponding event occurs in the settlement machine 12. In the present embodiment, the state flag of the event occurring is set to "1", and the state flag of the event not yet occurring is set to "0".

The event "change machine error" refers to an event in which an error such as a coin clogging, banknote clogging, or the like occurs in the automatic change machine provided in the settlement machine 12. The event "residual detection" refers to a situation in which the change discharged to the change tray of the automatic change machine remains thereon without being collected. The event "near warning" refers to an occurrence of change coins or banknotes being near empty or near full in the automatic change machine.

FIGS. 8 to 11 are flowcharts illustrating a procedure of a main part of information processing executed by the processor 51 of the register 11 according to a predetermined program. The program controls the operation of the register 11 from the start of registration of the commodity purchased by the shopper 22 to the transmission of the settlement data of the shopper 22 to the one of the settlement machines 12. The program is stored in the main memory 52 or the auxiliary storage device 53. Hereinafter, the operation of the register 11 is described with reference to FIGS. 8 to 11. The content described below is an example. The procedure and content thereof are not particularly limited as long as the results similar to that of the present embodiment can be obtained.

The processor 51 first clears a registration list in Act 1. The registration list is arranged in the volatile area of the main memory 52. The registration list is an area for registering sales data such as the commodity code, commodity name, unit price, number, amount of money, and the like of the commodity to be purchased by the shopper 22.

After clearing the registration list, the processor 51 determines whether or not an interrupt signal from the settlement machine 12 is received in Act 2. The interrupt signal is the above-described change machine error signal, the residual detection signal, the near warning signal, the change machine error release signal, the residual detection release signal, or the near warning release signal.

If the interrupt signal is not received (NO in Act 2), the processor 51 determines the presence or absence of an input from the input device in Act 3. Specifically, the processor 51 determines the presence or absence of a scanning input by the scanner 35, and the presence or absence of a touch input to the store clerk touch panel 32.

If there is no input from the input device (NO in Act 3), the process returns to Act 2. In Acts 2 and 3, the processor 51 receives the interrupt signal from the settlement machine 12 or waits for an input from the input device.

In this standby state, if determining presence of the input from the input device (YES in Act 3), the processor 51 further determines whether or not the input is a scanning input by the scanner 35 in Act 4. If the input is not a scanning input (NO in Act 4), the processor 51 determines whether or not the input is a touch input to the store clerk touch panel 32 in Act 5. If the input is not a touch input (NO in Act 5), the processor 51 executes processing for another input. This processing is not an important matter for describing the present embodiment, and therefore the description thereof is omitted.

Figure 9:
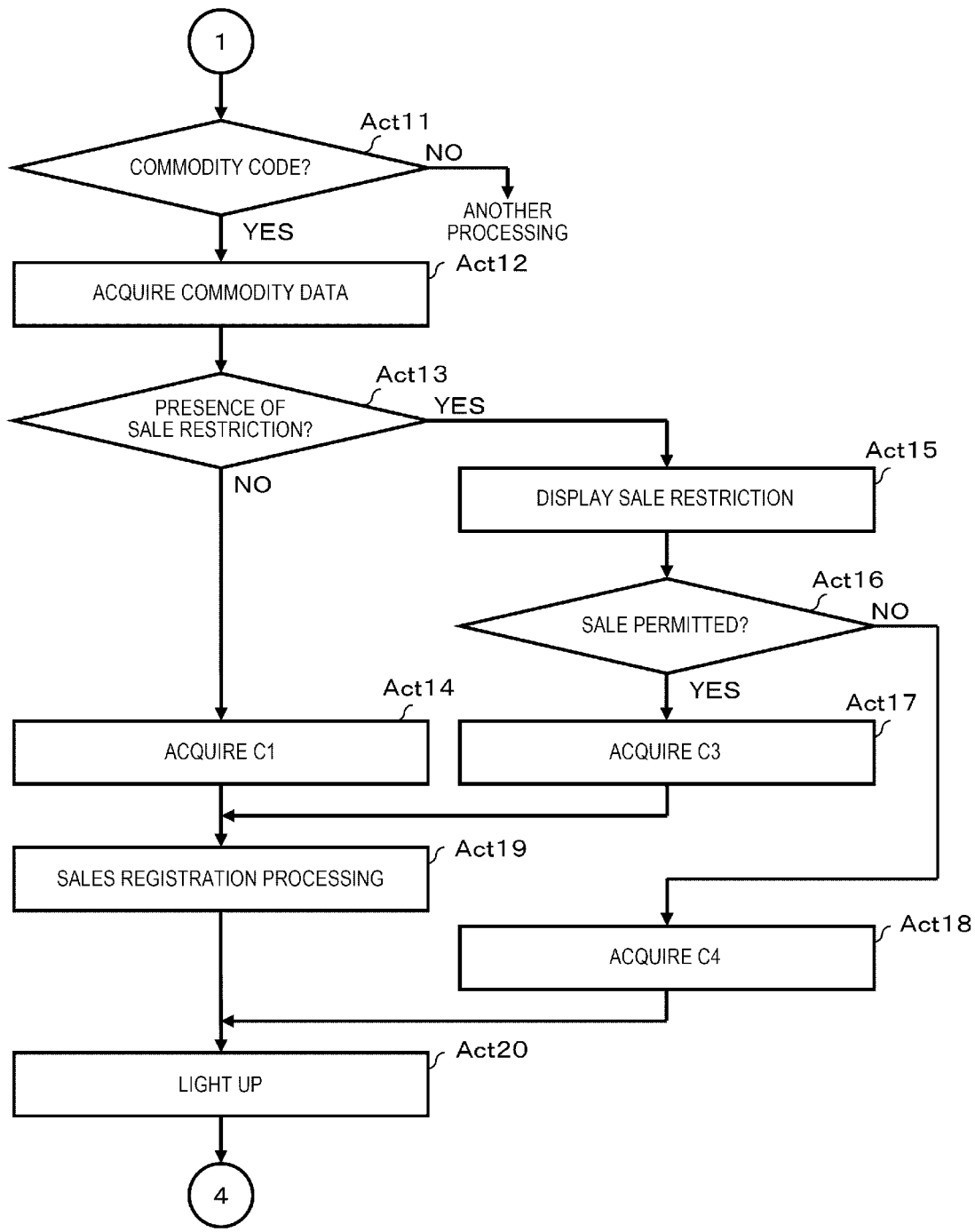

If the input in Act 3 is a scanning input by the scanner 35 (YES in Act 4), the processor 51 executes the processing of the procedure shown in the flowchart in FIG. 9. The processor 51 determines whether or not the data of the code symbol input in Act 11 includes a commodity code. If the data does not include a commodity code (NO in Act 11), the processor 51 executes processing for another code symbol. This processing is also not an important matter for describing the present embodiment, and therefore the description thereof is omitted.

If the data of the code symbol input includes a commodity code (YES in Act 11), the processor 51 retrieves the commodity data file 60 with the commodity code in Act 12 and acquires the data record 60R including the commodity code.

If the data record 60R is acquired, the processor 51 examines the sale restriction flag F2 included in the data record 60R in Act 13. If the sale restriction flag F2 is "0", that is, the commodity specified by the commodity code is not restricted for sale (NO in Act 13), the processor 51 acquires the color data C1 set in association with the event "scan registration" from the first table 61 in Act 14.

On the other hand, if the sale restriction flag F2 is "1", that is, if the commodity specified by the commodity code is restricted for sale (NO in Act 13), the processor 51 displays a notification for the shopper 22 that the commodity is restricted for sale, e.g., minimum age requirement, in Act 15.

For example, the processor 51 displays a "Yes" button image and a "No" button image together with a guidance "Age verification is necessary. 20 years old or over?" on the customer touch panel 37. The shopper 22 touches the "Yes" button image if he or she is 20 years old or over. In the case of age less than 20 years old, the shopper 22 touches the "No" button image.

Alternatively, the processor 51 displays a "Yes" button image and a "No" button image together with a guidance "Age verification is necessary. Check! if over 20 years old" on the store clerk touch panel 32. The store clerk 21 confirms the age of the shopper 22 and, if the shopper is 20 years old or over, touches the "Yes" button image. In the case of age less than 20 years old, the store clerk 21 touches the "No" button image.

The processor 51 that performs a display relating to the sales restriction in Act 15 determines whether or not to permit the sales in Act 16. If detecting that the "Yes" button displayed on the customer touch panel 37 or the store clerk touch panel 32 is touched, the processor 51 permits the sales. On the other hand, if it is detected that the "No" button is touched, the processor 51 does not permit the sales.

If the sales is permitted (YES in Act 16), the processor 51 acquires the color data C3 set in association with the event "sale restriction cleared" from the first table 61 in Act 17. If the sales is not permitted (NO in Act 16), the processor 51 acquires the color data C4 set in association with the event "sale restriction not cleared" from the first table 61 in Act 18.

If acquiring the color data C1 or the color data C3 in Act 14 or Act 17, the processor 51 executes sales registration processing in Act 19. The processor 51 multiplies the unit price included in the data record 60R acquired by the processing in Act 12 by the number of sales of the commodity to calculate the sales amount. If a multiplier is input by the ten-key and the multiplication key on the keyboard 33, the number of sales is the multiplier, or if the multiplier is not input, the number is "1". The processor 51 generates sales data of the commodity from the commodity code, commodity name, and unit price included in the data record 60R, and the number of sales of the commodity and the sales amount. Then, the processor 51 registers this sales data in the registration list.

If completing the sales registration processing in Act 19 or acquiring the color data C4 in Act 18, the processor 51 activates the LED lamp 40 for a predetermined time period in Act 20. Specifically, if the processor 51 acquires the color data C1 in Act 14, the processor 51 outputs the lighting signal of the color data C1 from the output port 57 for the predetermined time period. By this control, the LED lamp 40 turns on and keeps the lighting for the predetermined time period in the color represented by the color data C1. If the processor 51 acquires the color data C3 in Act 17, the processor 51 outputs the lighting signal of the color data C3 from the output port 57 for the predetermined time period. By this control, the LED lamp 40 turns on and keeps the lighting for the predetermined time period in the color represented by the color data C3. If the processor 51 acquires the color data C4 in Act 19, the processor 51 outputs the lighting signal of the color data C4 from the output port 57 for the predetermined time period. By this control, the LED lamp 40 turns on and keeps the lighting for the predetermined time period in the color represented by the color data C4.

Figure 8:
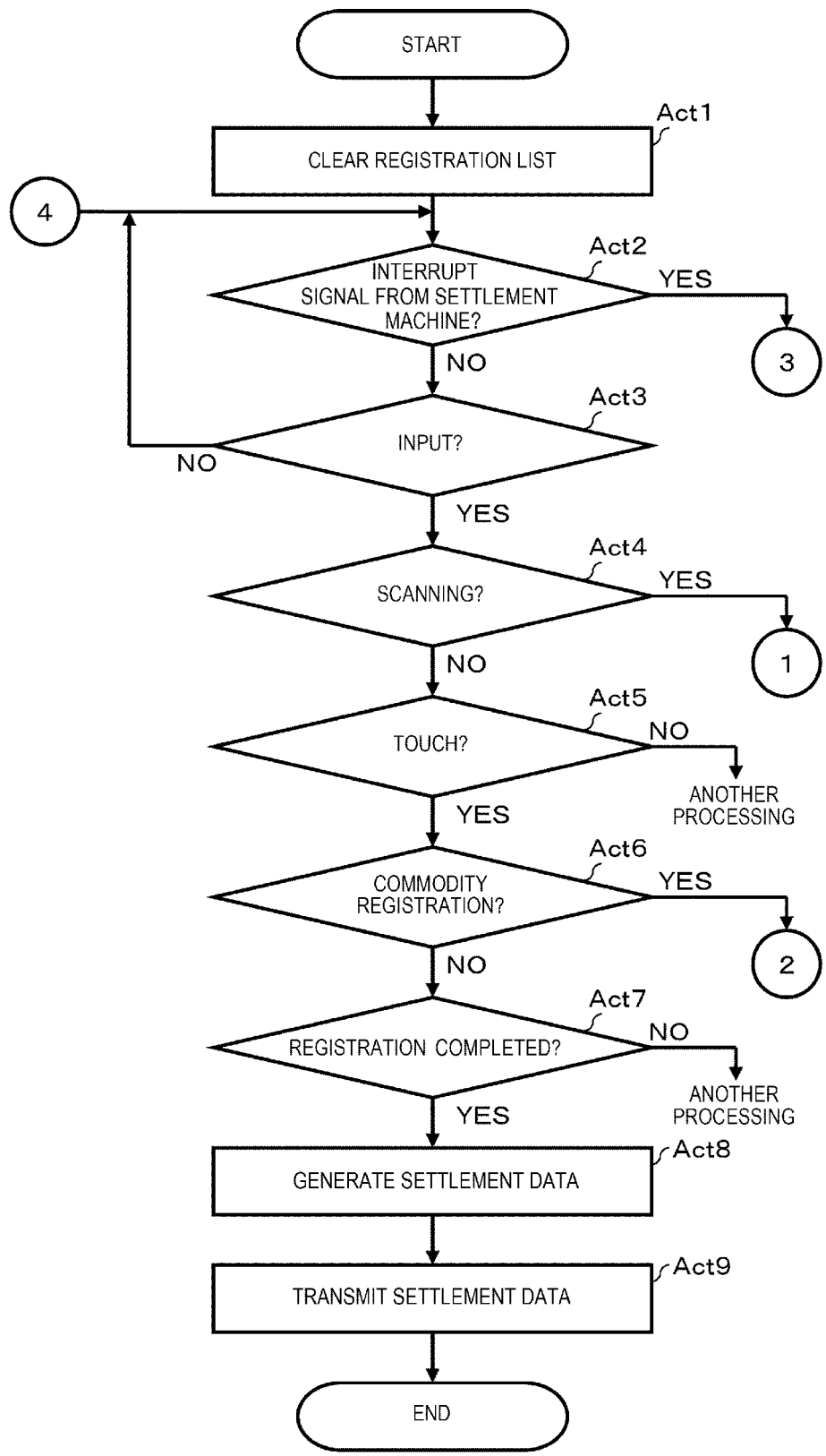
FIGS. 8-11 are flowcharts illustrating a procedure of an essential part of information processing executed by a processor of the register in accordance with a predetermined program.

Upon completion of the processing in Act 20, the processor 51 returns to the standby state in Act 2 or Act 3 in FIG. 8.

In Act 13, the computer mainly composed of the processor 51 executes the processing to serve as a determination module for determining whether or not the commodity identified by the commodity code input via the input device (scanner 35) is a sales-restricted commodity the sales of which is to be allowed if the predetermined condition is satisfied or qualified. Further, by executing the processing in Act 19, the computer serves as a processing module for processing sales data of the commodity identified by the commodity code input via the input device (scanner 35). In addition, by executing the processing in Acts 15, 16, and 19, if the commodity identified by the commodity code input via the input device (scanner 35) is a sales-restricted commodity, the computer serves as a processing module for processing the sales data of the sales-restricted commodity if the predetermined condition is satisfied. Further, by executing the processing in Acts 14, 17, and 20, the computer serves as a control module for controlling the notification device (LED lamp 40) to perform a notification operation if the sales data is processed by the processing module. In addition, by executing the processing in Acts 18 and 20, the computer serves as a control module for controlling the notification device (LED lamp 40) to perform a notification operation even if the commodity identified by the commodity code input via the input device (scanner 35) is a sales-restricted commodity and the predetermined condition is not satisfied. At least the notification operation by the former control module (first control module) and the notification operation by the latter control module (second control module) are different from one the other. Specifically, the luminescent colors of the LED lamps 40 between the two notification operations are different.

On the other hand, if the input confirmed in Act 3 in FIG. 8 is a touch input to the store clerk touch panel 32 (YES in Act 5), the processor 51 determines whether or not the commodity-registration is input with the touch input in Act 6. If the touch input is not the commodity-registration (NO in Act 6), the processor 51 determines whether or not the touch input is the end of the registration in Act 7. If the touch input is not the end of the registration (NO in Act 7), the processor 51 executes processing for another touch input. This processing is not an important matter for describing the present embodiment, and therefore the description thereof is omitted.

In the standby state in Act 2 or Act 3, a commodity registration screen is displayed on the display 321 of the store clerk touch panel 32. On the commodity registration screen, a plurality of commodity button images each of which is assigned to a commodity code of a commodity without a barcode are displayed. In addition, an end button image for instructing the end of the registration of the commodity to be purchased by the shopper 22 is also displayed on a part of the commodity registration screen.

If the button image touch-input is the commodity button image, the processor 51 determines that the commodity-registration is input in Act 6. Similarly, if the button image touch-input is the end button image, the processor 51 determines that the commodity-registration is ended in Act 7.

Figure 10:
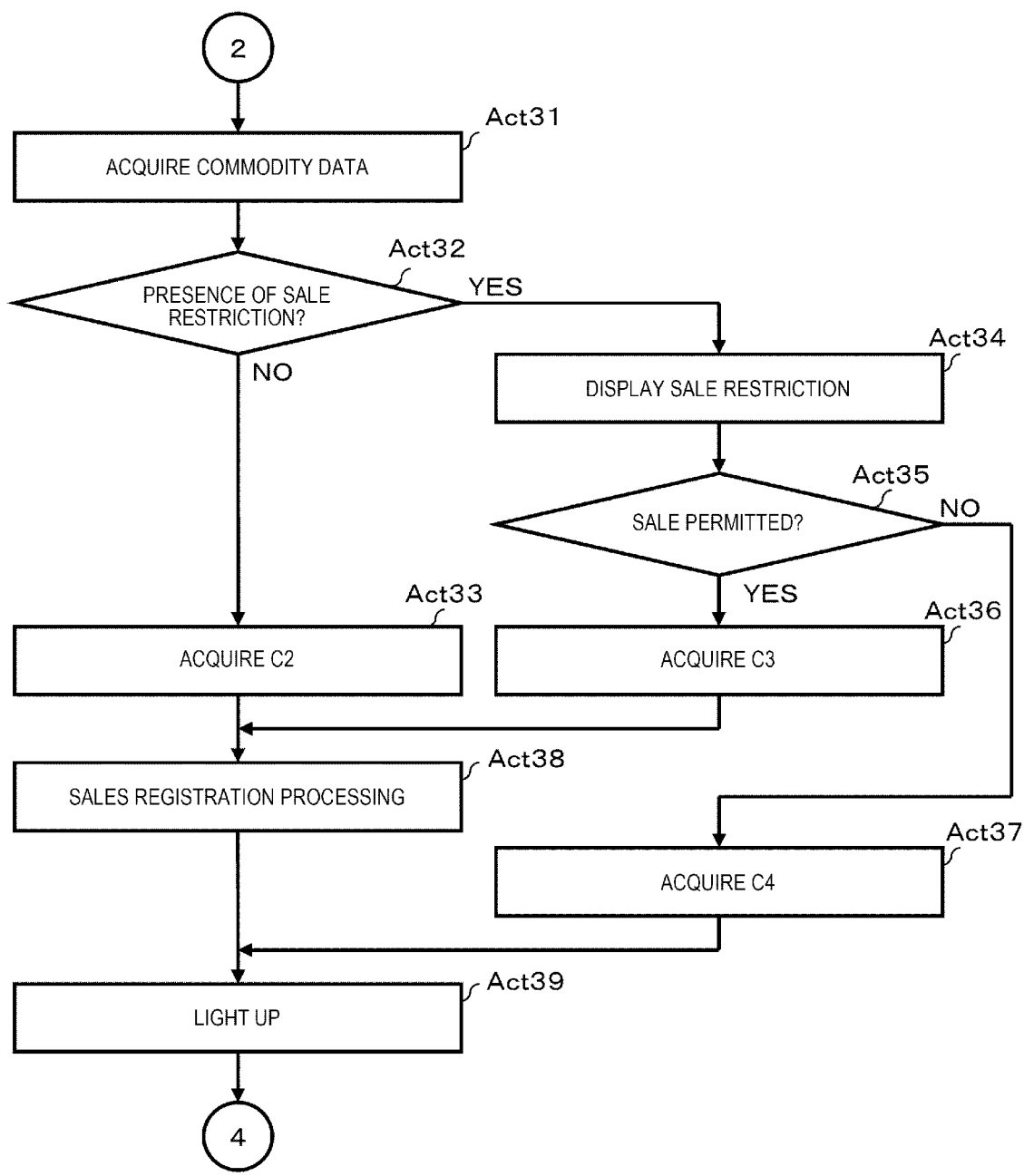

If the processor 51 determines that the touch-input is the commodity-registration (YES in Act 6), the processor 51 executes the processing shown in the flowchart in FIG. 10. The processor 51 retrieves the commodity data file 60 with the commodity code corresponding to the commodity button image touch-input in Act 31 to acquire the data record 60R including the commodity code assigned to the commodity button image which is touched.

If the data record 60R is acquired, the processor 51 examines the sales-restriction flag F2 included in the data record 60R in Act 32. If the sales-restriction flag F2 is "0", in other words, if the commodity specified by the commodity code touch-input is not restricted for sale (NO in Act 32), the processor 51 acquires the color data C2 set in association with the event "touch registration" from the first table 61 in Act 33.

On the other hand, if the sales-restriction flag F2 is "1", in other words, if the commodity specified by the commodity code touch-input is restricted for sale (YES in Act 32), the processor 51 executes the same processing as in Act 15 to Act 18 in FIG. 9 in Act 34 to Act 37 in FIG. 10. If the sales is permitted, the processor 51 acquires the color data C3 set in association with the event "sales-restriction cleared" from the first table 61. If the sale is not permitted, the processor 51 acquires the color data C4 set in association with the event "sales-restriction not cleared" from the first table 61.

In Act 33 or Act 36, if acquiring the color data C2 or the color data C3, the processor 51 executes the same sales registration processing as in Act 19 in Act 38. Or, if completing the sales registration processing in Act 38 or acquiring the color data C4 in Act 37, the processor 51 turns on the LED lamp 40 and keeps lighting for the predetermined time period in Act 39. More specifically, if acquiring the color data C2 in Act 33, the processor 51 performs processing to output the lighting signal of the color data C2 from the output port 57 for the predetermined time period. In response to the lighting signal, the LED lamp 40 turns on for the predetermined time period in the color of the color data C2. If acquiring the color data C3 in Act 36, the processor 51 performs the processing to output the lighting signal of the color data C3 from the output port 57 for the predetermined time period. In response to the lighting signal, the LED lamp 40 turns on for the predetermined time period in the color of the color data C3. If acquiring the color data C4 in Act 37, the processor 51 performs the processing to output the lighting signal of the color data C4 from the output port 57 for the predetermined time period. The LED lamp 40 turns on for the predetermined time period in the color of the color data C4.

Upon completion of the processing in Act 39, the processor 51 returns to the standby state in Act 2 or Act 3 in FIG. 8.

By executing the processing in Act 32, the computer mainly composed of the processor 51 serves as a determination module for determining whether or not the commodity identified by the commodity code input via the input device (store clerk touch panel) is a sales-restricted commodity the sales of which is allowed if the predetermined condition is satisfied. Further, by executing the processing in Act 38, the computer serves as a processing module for processing sales data of the commodity identified by the commodity code input via the input device (store clerk touch panel). In addition, by executing the processing in Acts 34, 35, and 38, if the commodity identified by the commodity code input via the input device (store clerk touch panel) is a sales-restricted commodity, the computer serves as a processing module for processing the sales data of the sales-restricted commodity if the predetermined condition is satisfied. Further, by executing the processing in Acts 33, 36, and 39, the computer serves as a control module for performing the notification operation by the notification device (LED lamp 40) if the sales data is processed by the processing module. In addition, by executing the processes in Acts 37 and 39, the computer serves as a control module for performing the notification operation by the notification device (LED lamp 40) even if the commodity identified by the commodity code input via the input device (scanner 35) is a sales-restricted commodity and the predetermined condition is not satisfied. At least the notification operation by the former control module (third control module) and the notification operation by the latter control module (fourth control module) are different from one the other. Specifically, the luminescent colors of the LED lamps 40 between the operations by two control modules are different.

Returning to the description in FIG. 8, in Act 7 of FIG. 8, the processor 51 generates the above-described settlement data from the sales data registered in the registration list in Act 8 if it is determined that the touch input is end of the registration (YES in Act 7). Then, the processor 51 controls the communication interface 55 to transmit the settlement data to the settlement machine 12 in Act 9. By this control, the settlement data is transmitted to the settlement machine 12 via the network 13. Thus, the processor 51 ends the processing for the shopper 22.

For example, the settlement data is transmitted to preset one settlement machine 12 (default machine) in a plurality of settlement machines 12. At this time, if the settlement machine 12 receiving the settlement data cannot perform the settlement processing due to, for example, a busy state or an error occurrence, the settlement machine 12 transfers the settlement data to another settlement machine 12 via the network 13. If the settlement machine 12 capable of settlement processing receives the settlement data, a response signal is transmitted from the settlement machine 12 receiving the transmitted settlement data to the register 11. The register 11 receiving the response signal displays an image specifying the settlement machine 12 which sends the response signal on the store clerk touch panel 32 or the customer touch panel 37 thereof. As a result, the shopper 22 whose registration of the purchased commodity is completed moves to the settlement machine 12 specified by the image to carry out the payment operation on the settlement machine 12.

As described above, in the register 11, if the barcode attached to the commodity purchased is scanned by the scanner 35 and the commodity is not restricted for sale, the LED lamp 40 turns on for the predetermined time period in the color of the color data C1 at the time the settlement data of the commodity is registered in the registration list. Similarly, if a button image of the commodity purchased displayed on the store clerk touch panel is touched and the commodity is not restricted for sale, the LED lamp 40 turns on for the predetermined time period in the color of the color data C2 at the time the settlement data of the commodity is registered in the registration list. In addition, if the commodity purchased is restricted for sale, the LED lamp 40 turns on for the predetermined time period in the color of the color data C3 at the time the predetermined sales condition of the commodity is satisfied and the sales data of the commodity is registered in the registration list. On the other hand, if the sales condition of the commodity is not satisfied, the LED lamp 40 turns on for the predetermined time period in the color of the color data C4.

Therefore, if the LED lamp 40 turns on in the color of the color data C1, C2 or C3, the operator of the register 11 can notice that the sales data of the commodity is correctly registered in the registration list. In the present embodiment, the LED lamp 40 is provided on a part of the upper edge of the frame of the store clerk touch panel. With this configuration, the operator can recognize whether or not the LED lamp 40 turns on without being conscious of the information displayed on the store clerk touch panel. Therefore, the work efficiency of the operator for the register 11 is not deteriorated.

Figure 11:
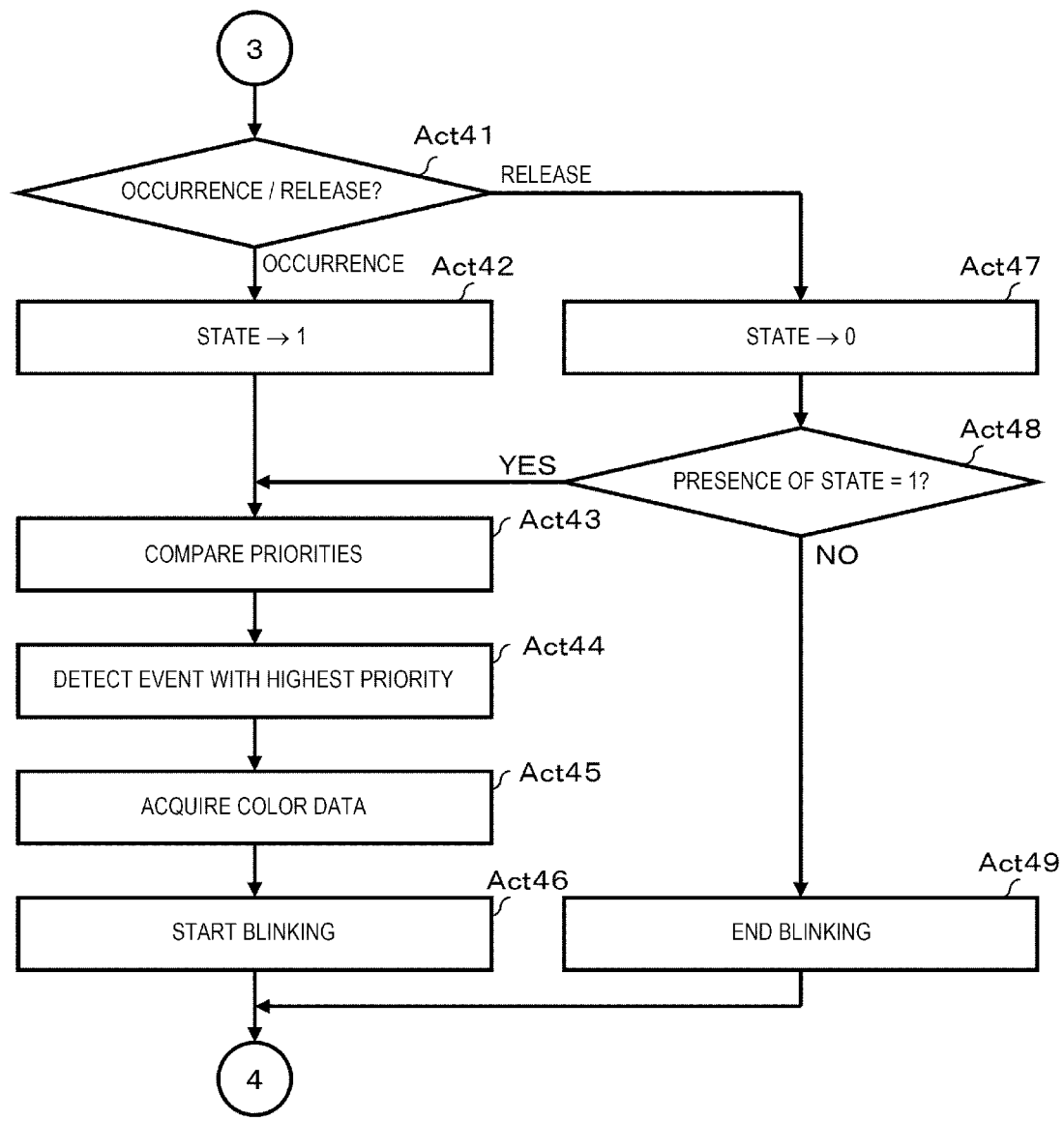

Returning to the description of FIG. 8, if receiving an interrupt signal from one of the settlement machines 12 (YES in Act 3) in the standby state in Acts 2 and 3, the process proceeds to the processing shown in the flowchart in FIG. 11. The processor 51 determines whether the interrupt signal is an event occurrence signal or an event release signal in Act 41. If the interrupt signal is one of an error signal, a residual detection signal, and a near warning signal ("occurrence" in Act 41), the processor 51 changes the state flag corresponding to the event in the second table 62 to "1" in Act 42. Specifically, if receiving the change machine error signal, the processor 51 changes the state flag of the event "change machine error" to "1". If receiving the residual detection signal, the processor 51 changes the state flag of the event "residual detection" to "1". Further, if receiving the near warning signal, the processor 51 changes the state flag of the event "near warning" to "1".

Next, the processor 51 compares the priority data of the event the state flag of which is "1" in Act 43. Then, the processor 51 detects the event with the lowest priority data among the events with the highest priority, i.e., the evens the state flag of which is "1" in Act 44.

The processor 51 acquires the color data set in the second table 62 in association with the event detected in Act 45. For example, if the event having the state flag "1" is only the "near warning", the processor 51 acquires the color data C7. In this state, if the state flag of the event "residual detection" becomes "1", the processor 51 acquires the color data C6. If the state flag of the event "change machine error" becomes "1", the processor 51 acquires the color data C5.

In Act 45, if any one of color data described above is acquired, the processor 51 causes the LED lamp 40 to blink in Act 46. Specifically, if acquiring the color data C7, the processor 51 performs a control operation to output the blinking signal of the color data C7 from the output port 57. By this control, the LED lamp 40 repeats the blinking operation in the color of the color data C7. If acquiring the color data C6, the processor 51 performs the control operation to output the blinking signal of the color data C6 from the output port 57. By this control, the LED lamp 40 repeats the blinking operation in the color of the color data C6. If acquiring the color data C5, the processor 51 performs the control operation to output the blinking signal of the color data C5 from the output port 57. By this control, the LED lamp 40 repeats the blinking operation in the color of the color data C5. Thereafter, the processor 51 returns to the standby state in Act 2 or Act 3 in FIG. 8.

On the other hand, in Act 41, if the received interrupt signal is one of a change machine error release signal, a residual detection release signal, and a near warning release signal ("release" in Act 41), the processor 51 changes the state flag corresponding to the event in the second table 62 to "0" in Act 47. Specifically, if receiving the change machine error release signal, the processor 51 changes the state flag of the event "change machine error" to "0". If receiving the residual detection release signal, the processor 51 changes the state flag of the event "residual detection" to "0". If receiving the near warning release signal, the processor 51 changes the state flag of the event "near warning" to "0".

Next, the processor 51 retrieves the second table 62 in Act 48 to determine the presence/absence of an event the state flag of which is "1". If the state flag of at least one event is "1" (YES in Act 48), the processor 51 executes the processing in Act 43 to Act 46 described above.

On the other hand, if the state flag of all the events is "0" (NO in Act 48), the processor 51 ends the blinking of the LED lamp 40 in Act 49. Specifically, the processor 51 stops the blinking signal output from the output port 57 to the LED lamp 40. As a result of this control, the LED lamp 40 which continues the blinking is turned off. Thereafter, the processor 51 returns to the standby state in Act 2 or Act 3 in FIG. 8.

The computer including the processor 51 executes the processing in Act 41 to Act 49 to serve as a control module for performing a notification operation by the notification device (LED lamp 40) based on the information received from the settlement device (settlement machine 12) via the communication interface 55. In particular, the computer executes the processing in Act 43 to Act 46 to recognize the priority of the information received from the settlement device (settlement machine 12) and serves as the control module for altering the notification operation according to the recognized priority.

In this way, in the register 11 to which the plurality of settlement machines 12 are connected, if the register 11 receives the near warning signal from one of the settlement machines 12, the LED lamp 40 blinks in the color of the color data C7 only if no change machine error signal or no residual detection signal is received. Similarly, if the residual detection signal is received from the settlement machine 12, the LED lamp 40 blinks in the color of the color data C6 only if no change machine error signal is received. In addition, if the change machine error signal is received from the settlement machine 12, the LED lamp 40 blinks in the color of the color data C5 irrespective of whether no near warning signal or no residual detection signal is received.

Therefore, if the LED lamp 40 is blinking in the color of the color data C7, the operator of the register 11 can intuitively notice that a warning of near empty or near full issues in the automatic change machine of one of the settlement machines 12. Similarly, if the LED lamp 40 is blinking in the color of the color data C6, the operator can recognize that a residual detection warning issues in the automatic change machine of one of the settlement machines 12. In addition, if the LED lamp 40 is blinking in the color of the color data C5, the operator can recognize that an error such as a coin clogging, a banknote clogging or the like occurs in the automatic change machine of one of the settlement machines 12. The LED lamp 40 is provided on a part of the upper edge of the frame of the store clerk touch panel. Thus, the operator can recognize whether or not the LED lamp 40 is blinking without being conscious of the information displayed on the store clerk touch panel. Therefore, the work efficiency of the operator for the register 11 is not deteriorated.

In a state in which the LED lamp 40 is blinking, if the lighting signal of the color data C1, for example, is output from the output port 57 for the predetermined time period by the processing in Act 20 in FIG. 9, the LED lamp 40 turns on in the color of the color data C1 for the predetermined time period and thereafter returns to the blinking operation just before the lighting in the color of the color data C1. The above operation also applies to the cases in which lighting signals of other color data C2, C3, and C4 are respectively output from the output port 57 for a predetermined time period.

As described in detail above, according to the present embodiment, the register 11 can enable the operator to recognize that the sales data is correctly processed by lighting of the LED lamp 40. In particular, in the case of commodities with minimum age requirement on purchasing like alcoholic beverages and cigarettes, the operator can recognize that the sales is permitted for a commodity with a minimum age requirement after the operation of age verification is performed and the sales data of the commodity is correctly processed.

Further, according to the present embodiment, the register 11 enables the operator to recognize that an error or an warning occurs in the settlement machine 12 connected via the network 13 by blinking of the LED lamp 40. In this case, the luminescent color of the LED lamp 40 varies depending on the category of error or warning, and therefore the operator can easily identify which category of error or warning is occurring.

In addition, in the present embodiment, priorities are set for errors or warnings that may occur in the settlement machine 12. Then, the LED lamp 40 blinks in the luminescent color corresponding to the error or the warning with the highest priority among the errors or warnings that are occurring. Therefore, by assigning the higher priority to an error or warning with high urgency, the operator or a service person can deal with the error or warning with high urgency, quickly.

As described above, an embodiment of a commodity sales data processing apparatus that enables the operator to recognize that sales data is correctly processed is described, but such an embodiment is not limited thereto.

In the above embodiment, whichever interrupt signal is received from any of the settlement machines 12, the LED lamp 40 is blinking in the luminescent color corresponding to the type of the interrupt signal. In this regard, the luminescent color may be changed for each settlement machine 12 by including data for identifying the settlement machine 12 in the interrupt signal. Alternatively, the LED lamps 40 are paired. The category of an error or warning may be indicated by the luminescent color of one LED lamp and the settlement machine 12 from which the interrupt signal outputs may be indicated by the luminescent color of the other LED lamp.

In the embodiment, the case in which the functions of a commodity sales data processing apparatus are applied to a register with a checkout system of a semi-self-service type is described. There is also a case, as another embodiment, in which the functions of the register 11 and the functions of the settlement machine 12 are applied to a POS (Point Of Sales) terminal. The POS terminal may be a face-to-face type or a self-service-type. In this case, the POS terminal enables the operator to recognize that the sales data is correctly processed by lighting of the LED lamp 40. In this case, the second table 62 in FIG. 7 is omitted. In addition, the processing in Act 2 in FIG. 8 and the processing in Act 41 to Act 49 in FIG. 11 are also omitted.

Alternatively, there is a case, as still another embodiment, in which the register 11 is specialized for notifying an error or warning occurred or generated in the settlement machine 12. In this case, the first table 61 in FIG. 6 is omitted. In addition, the processing in Act 2 in FIG. 8 and the processing other than the processing in Act 41 to Act 49 in FIG. 11 are omitted.

In the above embodiment, a case in which the LED lamp 40 is arranged at a part of the upper edge of the frame surrounding the screen of the store clerk touch panel 32 is described. The position of the LED lamp 40 is not limited to a part of the upper edge of the frame. However, in the present embodiment, since the LED lamp 40 is arranged at the upper edge of the frame, there is an advantage that both store clerk 21 and shopper 22 can confirm the state of the LED lamp 40 at the same time. In addition, for example, the register 11 is always monitored with a camera attached to the ceiling of the checkout lane, and therefore, there is also an advantage that the state of the LED lamp 40 can be confirmed from a remote location. For example, a part of the frame may be turned on or blinked by the LED lamp as long as such an advantage described above can be realized.

The interrupt signal from the settlement machine 12 is not limited to the above-described change machine error signal, residual detection signal, near warning signal, change machine error release signal, residual detection release signal, and near warning release signal.

A notification device is not limited to the LED lamp 40. The notification device may only be a device which performs an informing operation that the operator intuitively notices.

Transfer of the register 11 is generally performed in a state where the program is stored in the main memory 52 or the auxiliary storage device 53. However, the present exemplary embodiment is not limited thereto, and transfer of the register 11 may be performed in a state where the program is not stored in the main memory 52 or the auxiliary storage device 53. In this case, a program or the like individually transferred from the register 11 may be written in a writable storage device of the register 11 according to an operation by a user or the like. The transfer of the program and the like may be performed by recording the program and the like on a removable recording medium or by communication via a network. The recording medium may be in any form such as a CD-ROM, a memory card, and the like as long as the medium may store a program and is readable by the apparatus. In addition, a function obtained by installing or downloading a program may be one which performs the function in cooperation with an operating system (OS) or the like inside the apparatus.

While certain embodiments have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A register apparatus comprising:
   a scanner configured to perform an optical product code reading from a product;
   an operation panel configured to receive a product code input;
   a status indicator comprising a light emitting device; and
   a processor configured to:
      process a product code of a product for a transaction obtained through the scanner or the operation panel, to determine whether or not the product code is associated with a predetermined sales restriction and whether or not sale is allowed for the product; and
      control the status indicator to perform:
         a first indication when the product code is determined to be not associated with the predetermined sales restriction;
         a second indication when the product code is determined to be associated with the predetermined sales restriction and sales is determined to be allowed for the transaction; and
         a third indication when the product code is determined to be associated with the predetermined sales restriction and sales is determined to be not allowed for the transaction,
         wherein the first, second, and third indications comprise light emissions of different colors by the light emitting device.

2. The register apparatus according to claim 1, wherein the first indication includes a first sub indication when the product code is obtained through the scanner and a second sub indication when the product code is obtained through the operation panel.

3. The register apparatus according to claim 1, further comprising:
   a communication interface configured to communicate with one or more cashier apparatuses associated with the register apparatus, wherein
   the processor is further configured to control the communication interface to transmit registration data including data of one or more product codes obtained through the scanner or the operation panel to a selected one of the one or more cashier apparatuses, for processing payment for one or more products registered by the register apparatus.

4. The register apparatus according to claim 3, wherein the processor is further configured to control the status indicator to perform a fourth indication based on an error signal received through the communication interface from one of the one or more cashier apparatuses.

5. The register apparatus according to claim 4, wherein the fourth indication includes a first sub indication based on a first error signal received through the communication interface from the selected one of the one or more cashier apparatuses and a second sub indication based on a second error signal received through the communication interface from the selected one of the one or more cashier apparatuses.

6. The register apparatus according to claim 5, wherein the first and second error signals are associated with errors of a cash dispenser of the selected one of the one or more cashier apparatuses.

7. The register apparatus according to claim 4, wherein the processor is further configured to determine, as a priority error signal, one of a plurality of error signals of different types received through the communication interface from one of the one or more cashier apparatuses based on different priority levels associated with the plurality of error signals, respectively, and control the status indicator to perform the fourth indication based on the priority error signal.

8. The register apparatus according to claim 1, wherein the fourth indication comprises light emission of a light emitting pattern different from light emitting patterns of the light emissions of the first, second, third, and fourth indications.

9. The register apparatus according to claim 1, wherein the processor is further configured to:
  process the product code for sales registration when the product code is determined to be not associated with the predetermined sales restriction and when the product code is determined to be associated with the predetermined sales restriction and sales is determined to be allowed for the transaction, and
  disable sales registration of the product code when the product code is determined to be associated with the predetermined sales restriction and sales is determined to be not allowed for the transaction.

10. A register apparatus comprising:
  a scanner configured to perform an optical product code reading from a product;
  an operation panel configured to receive a product code input;
  a communication interface configured to communicate with one or more cashier apparatuses associated with the register apparatus;
  a status indicator; and
  a processor configured to:
    process a product code of a product for a transaction obtained through the scanner or the operation panel, to determine whether or not the product code is associated with a predetermined sales restriction and whether or not sale is allowed for the product;
    control the status indicator to perform:
      a first indication when the product code is determined to be not associated with the predetermined sales restriction;
      a second indication when the product code is determined to be associated with the predetermined sales restriction and sales is determined to be allowed for the transaction; and
      a third indication when the product code is determined to be associated with the predetermined sales restriction and sales is determined to be not allowed for the transaction
    control the communication interface to transmit registration data including data of one or more product codes obtained through the scanner or the operation panel to a selected one of the one or more cashier apparatuses, for processing payment for one or more products registered by the register apparatus;
    determine, as a priority error signal, one of a plurality of error signals of different types received through the communication interface from the selected one of the one or more cashier apparatuses based on different priority levels associated with the plurality of error signals, respectively; and
    control the status indicator to perform a fourth indication based on the priority error signal.

11. The register apparatus according to claim 10, wherein the first indication includes a first sub indication when the product code is obtained through the scanner and a second sub indication when the product code is obtained through the operation panel.

12. The register apparatus according to claim 10, wherein the fourth indication includes a first sub indication based on a first error signal received through the communication interface from the selected one of the one or more cashier apparatuses and a second sub indication based on a second error signal received through the communication interface from the selected one of the one or more cashier apparatuses.

13. The register apparatus according to claim 12, wherein the first and second error signals are associated with errors of a cash dispenser of the selected one of the one or more cashier apparatuses.

14. The register apparatus according to claim 10, wherein the processor is further configured to determine, as a priority error signal, one of a plurality of error signals of different types received through the communication interface from one of the one or more cashier apparatuses based on different priority levels associated with the plurality of error signals, respectively, and control the status indicator to perform the fourth indication based on the priority error signal.

15. The register apparatus according to claim 10, wherein the status indicator comprises a light emitting device, and the first, second, third, and fourth indications comprise light emissions of different colors by the light emitting device.

16. The register apparatus according to claim 15, wherein the fourth indication comprises light emission of a light emitting pattern different from light emitting patterns of the light emissions of the first, second, third, and fourth indications.

17. The register apparatus according to claim 10, wherein the processor is further configured to:
  process the product code for sales registration when the product code is determined to be not associated with the predetermined sales restriction and when the product code is determined to be associated with the predetermined sales restriction and sales is determined to be allowed for the transaction, and
  disable sales registration of the product code when the product code is determined to be associated with the predetermined sales restriction and sales is determined to be not allowed for the transaction.

18. A register apparatus comprising:
  a scanner configured to perform an optical product code reading from a product;
  an operation panel configured to receive a product code input;
  a communication interface configured to communicate with one or more cashier apparatuses associated with the register apparatus;
  a status indicator comprising a light emitting device; and
  a processor configured to:
    process a product code of a product for a transaction obtained through the scanner or the operation panel, to determine whether or not the product code is associated with a predetermined sales restriction and whether or not sale is allowed for the product;
    control the status indicator to perform:
      a first indication when the product code is determined to be not associated with the predetermined sales restriction;
      a second indication when the product code is determined to be associated with the predetermined sales restriction and sales is determined to be allowed for the transaction; and
      a third indication when the product code is determined to be associated with the predetermined sales restriction and sales is determined to be not allowed for the transaction;

control the communication interface to transmit registration data including data of one or more product codes obtained through the scanner or the operation panel to a selected one of the one or more cashier apparatuses, for processing payment for one or more products registered by the register apparatus; and control the status indicator to perform a fourth indication based on an error signal received through the communication interface from one of the one or more cashier apparatuses, wherein the first, second, third, and fourth indications comprise light emissions of different colors by the light emitting device.

19. The register apparatus according to claim 18, wherein the fourth indication comprises light emission of a light emitting pattern different from light emitting patterns of the light emissions of the first, second, third, and fourth indications.

* * * * *